United States Patent [19]
Thomas

[11] Patent Number: 5,348,130
[45] Date of Patent: Sep. 20, 1994

[54] ADVANCEABLE AUXILIARY CONVEYING APPARATUS

[75] Inventor: Terry M. Thomas, Franklin, Pa.

[73] Assignee: Joy MM Delaware, Inc., Wilmington, Del.

[21] Appl. No.: 99,704

[22] Filed: Jul. 30, 1993

[51] Int. Cl.$^5$ ............................................. B65G 21/10
[52] U.S. Cl. ................................. 198/312; 198/303; 198/861.1
[58] Field of Search ............... 198/302, 303, 309, 312, 198/314, 315, 316.1, 860.2, 861.1; 299/64, 18, 56

[56]  References Cited

U.S. PATENT DOCUMENTS

| | | | |
|---|---|---|---|
| 1,489,752 | 4/1924 | Fraley | 198/312 X |
| 2,242,206 | 5/1941 | Bisset | 198/302 X |
| 2,268,692 | 1/1942 | Bisset | 198/312 X |
| 2,479,823 | 8/1949 | Ernst | 198/312 |
| 2,805,751 | 9/1957 | Bergmann | 198/312 X |
| 3,413,035 | 11/1968 | Lockwood | 299/64 |
| 3,612,257 | 10/1971 | Goergen et al. | 198/204 |
| 4,206,840 | 6/1980 | Hanson | 198/316.1 X |
| 4,852,724 | 8/1989 | Bodimer | 198/861.2 |
| 4,890,720 | 1/1990 | Brais | 198/592 |
| 4,969,691 | 11/1990 | Moore et al. | 299/18 |
| 5,188,208 | 2/1993 | Hall | 198/312 X |

FOREIGN PATENT DOCUMENTS

40338/85  10/1985  Australia .
3621274A  1/1988  Fed. Rep. of Germany ...... 198/812

Primary Examiner—James R. Bidwell
Attorney, Agent, or Firm—Kirkpatrick & Lockhart

[57] ABSTRACT

An advanceable auxiliary conveying apparatus that comprises a trackway and an elevated roadway and conveying assembly movably attached to the trackway. The elevated roadway and conveying assembly is constructed to support a mobile conveyor thereon while receiving and conveying the material that is being discharged therefrom. An access ramp is movably attached to the elevated roadway and conveying assembly by at least one extendable cylinder that is used to advance the ramp away from the elevated roadway and conveying assembly. The elevated roadway and conveying assembly is equipped with elevation members that serve to elevate the elevated roadway and conveying assembly between a first elevated position wherein the trackway is suspended by the elevated roadway for advancement relative thereto and a second elevated position wherein the elevated roadway and conveying apparatus is movably supported on the trackway for advancement thereon. Extension and retraction of the cylinder attached to the elevated roadway and the ramp cause the trackway to be advanced forward and the elevated roadway and conveying assembly to be advanced on the trackway.

11 Claims, 13 Drawing Sheets

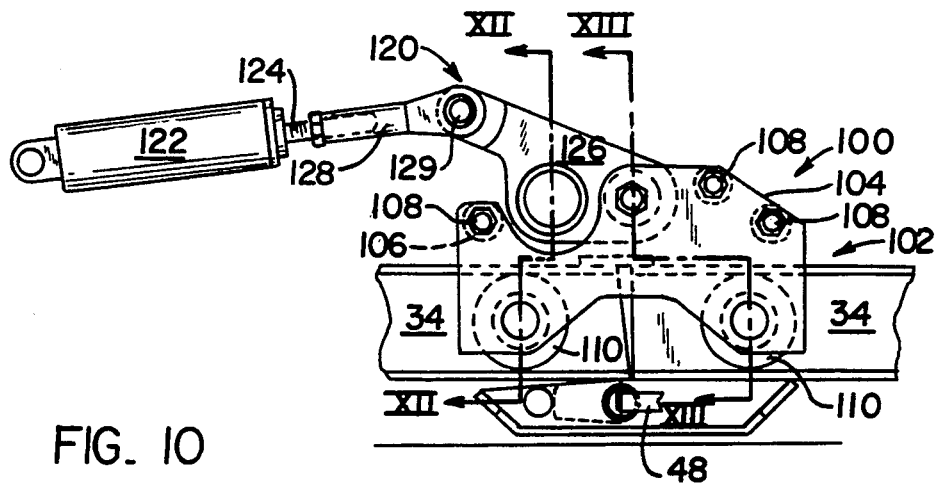
FIG. 10
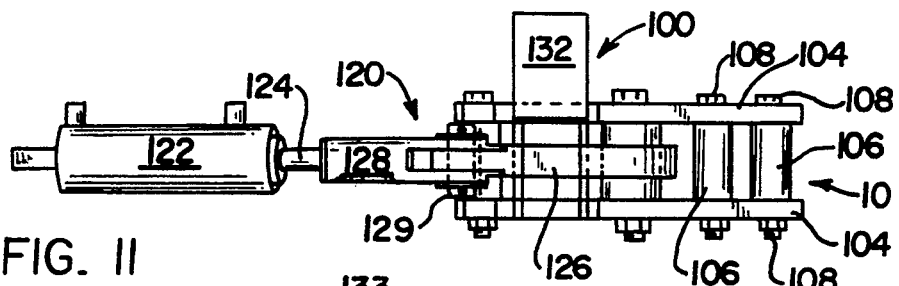
FIG. 11
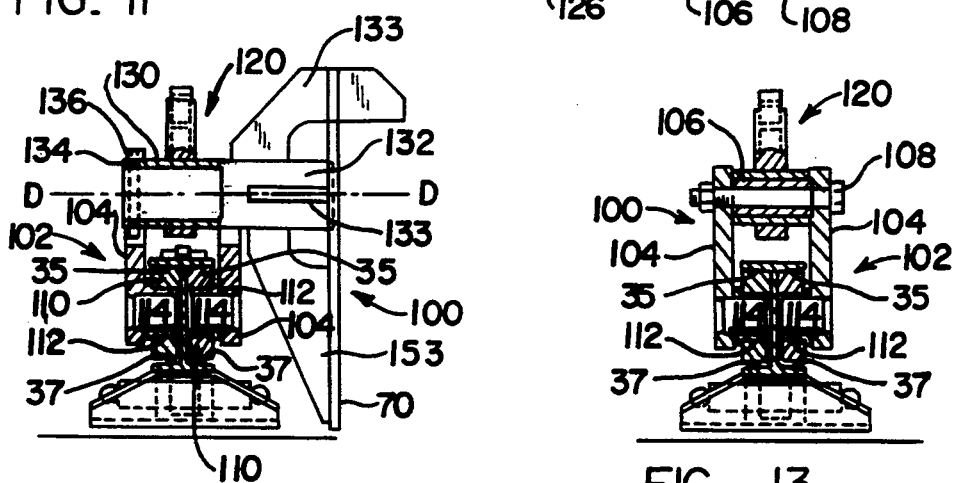
FIG. 12
FIG. 13
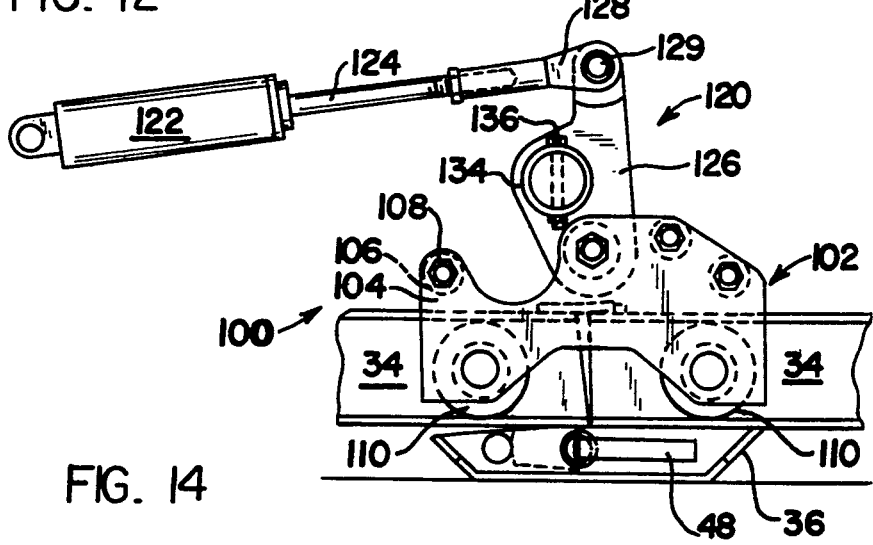
FIG. 14

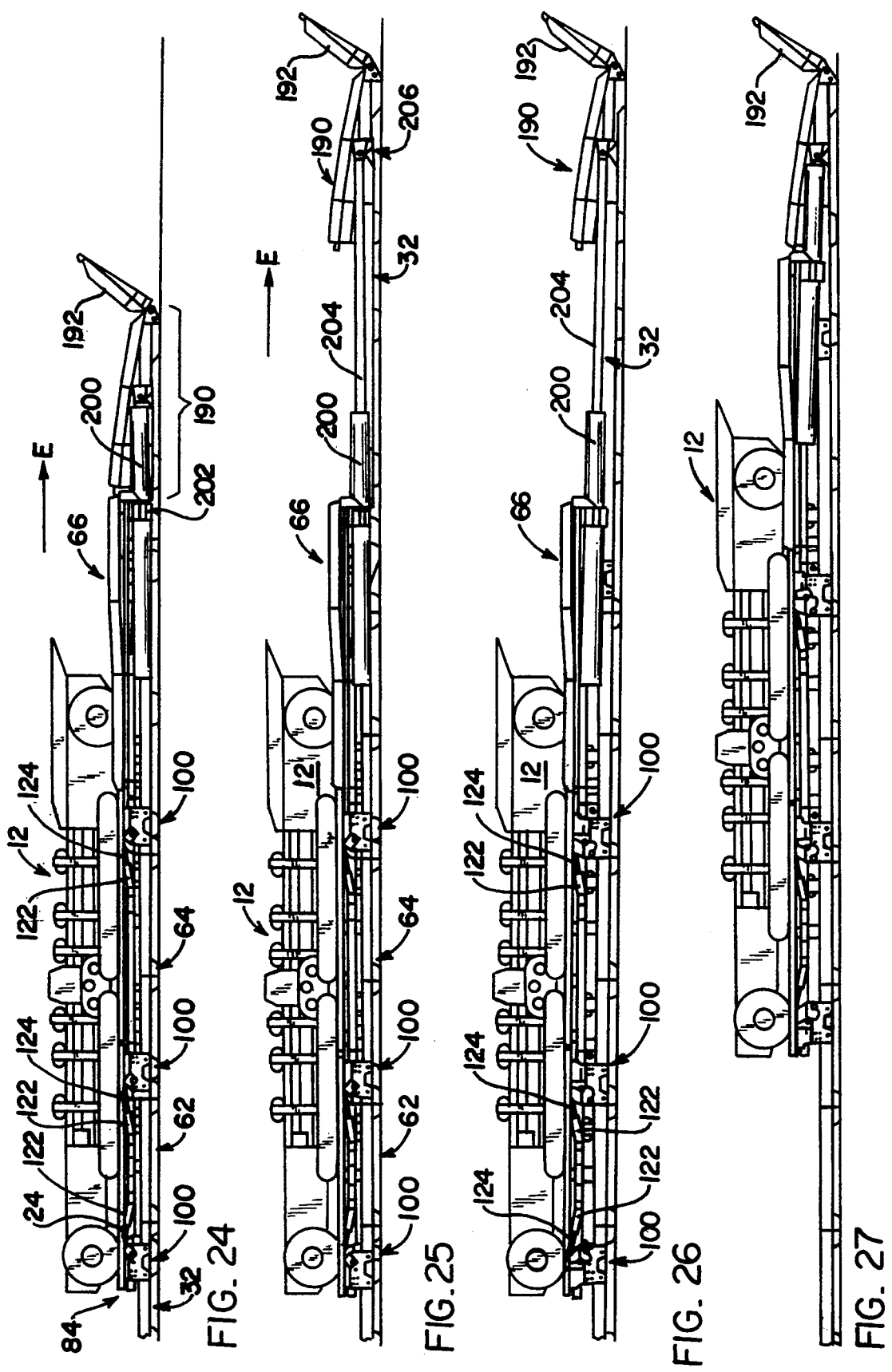

ADVANCEABLE AUXILIARY CONVEYING APPARATUS

BACKGROUND OF THE INVENTION

1. Field of the Invention

The present invention relates to conveying apparatus and, more particularly, is directed to advanceable auxiliary conveying apparatus for use in connection with mobile conveyor trains for conveying mined ore from a continuous mining machine.

2. Description of the Invention Background

In mining operations, especially in the underground mining of coal and the like, a variety of conveyors are used to transport the mined materials from the mining machine to their ultimate transportation location. During the early stages of mine development, main haulageways are created within the mine to accommodate stationary main belt conveyors that ultimately transport the mined ore from the mine or to remote collection areas. A variety of different conveying systems and apparatuses have been developed for transferring the mined material from the mining machine to the main belt conveyors.

One type of conveying apparatus commonly used to convey mined material from the mining machine to a main conveyor is a mobile articulated conveyor. Mobile articulated conveyors, such as the one disclosed in U.S. Pat. No. 4,852,724 to Bodimer, can move under self-propulsion along mine roadways and around corners while receiving the mined ore directly from the mining machine and discharging it onto the main conveyor or onto a separate stationary "panel" conveyor arranged for discharge onto the main conveyor.

A number of different auxiliary conveying apparatuses exist for transferring the mined material from the discharge of the mobile articulated conveyor to a stationary panel conveyor or main conveyor. For example, in one conveyor arrangement, the discharge end of the mobile conveyor is arranged to tram beside the stationary main or panel conveyor and a third "bridge" conveyor is employed to transfer the mined ore from the mobile conveyor to the stationary conveyor. To enable the discharge end of the bridge conveyor to traverse between intersecting stationary conveyors without interrupting the mining process, additional conveyors and guiding apparatus are typically used.

In another conveyor arrangement, the mobile articulated conveyor is trammed onto an elevated roadway that is mounted above an attending stationary panel or main conveyor belt for discharge thereupon. Because this conveyor arrangement eliminates the need for a bridge conveyor and its accompanying conveying apparatus, it is typically the preferred practice in mining schemes having adequate overhead clearance to support such stacked arrangement of conveyors. However, to extend the conveying system, the mining process must be interrupted so that additional lengths of conveyor and elevated roadway can be added to the existing conveyor network.

One type of elevated discharge system that is particularly directed to minimizing the amount of time required to extend an elevated roadway and its accompanying conveying system is disclosed in U.S. Pat. No. 4,969,691 to Moore et al. That system comprises a floor mounted beltway that has an elevated roadway rollably attached thereto. The beltway comprises a series of interconnected frame units that rest on the mine floor and support a continuous conveyor belt. The elevated roadway has wheels that are captured in outboard rails attached to the beltway for movably supporting the roadway thereon. Lift cylinders are attached to the roadway for lifting the beltway from the mine floor so that the beltway can be winched forward by a winch attached to a track driven ramp. As the individual interconnected units of the beltway are pulled from the roadway structure, they are skidded across the mine floor towards the track driven ramp. Thereafter, the cylinders are retracted and the roadway is then rollably winched forward on the beltway so that the entire system is in position to receive and convey the mined material as it is discharged from the mobile conveyor that is supported thereon. Additional belt structure must also be added to the rear of the beltway so that the beltway can continue to discharge the mined material onto the main belt.

The Moore et al. system does enable the elevated roadway and accompanying beltway to be extended without the need for additional auxiliary equipment; however, that system has a number of disadvantages. In particular, because the Moore system moves the elevated roadway and beltway relative to one another, the elevated roadway must comprise a separate independent structure that is capable of supporting the mobile conveying apparatus thereon. As such, the elevated roadway must be constructed with cross braces that interconnect and support the side portions of the elevated roadway. Those cross braces, however, extend across the opening above the beltway into which the mobile conveyor discharges. The braces, therefore, are often contacted by the mined material as it is discharged from the mobile conveyor. At times, due to its contact with the cross braces, pieces of the mined material are errantly thrown from the beltway structure. Such aberrantly discharged material creates a potentially hazardous condition for personnel working in the immediate area of the conveying system. Also, due to the relative proximity of the cross braces and the beltway, it is possible for larger pieces of mined material to become jammed between the cross braces and the beltway and thereby damage the belt or conveyor structure.

Also, because the elevated roadway and the beltway of Moore et al. are two independent structures that must be capable of supporting each other, in addition to supporting the mobile conveyor, they must be constructed from heavy duty structural members. Such structural members are not only expensive, but they also add to the overall weight of the system thereby making the system more difficult to move and transport within the confines of a mine. Moreover, an expensive heavy duty track mounted tail piece must be used to advance the beltway and roadway forward. Such tail piece must be equipped with heavy duty rams that can be driven into the mine roof to solidly anchor the tail piece in position so that it will remain stationary as the heavy beltway and roadway are winched forward.

Also, a typical mine floor may contain depressions, cavities, holes, etc. and, thus, is usually not perfectly level. As discussed above, the Moore system has a plurality of lift cylinders attached thereto for engaging the mine floor and lifting the beltway therefrom. If the portion of the mine floor under which one or more of the cylinders is situated is irregular or has a cavity or depression therein, the cylinder may not, when fully extended, contact the bottom thereof thereby creating an unstable structure upon which the beltway is to be advanced.

Moreover, advancement of the Moore system is a two step process. First, the beltway must be winched forward by the tailpiece. After the beltway has been advanced to the desired position, the winch must be disconnected from the beltway and attached to the roadway so that the roadway can be winched forward on the beltway. Such connection and disconnection of the winch and the separate advancement of the beltway and the roadway lengthen the amount of time that the mining process must be interrupted while the conveyor is advanced.

Thus, there is a need for an advanceable conveying system for use in connection with mobile conveying apparatus that does not include structure that will interfere with and divert material therefrom as it is being received from the mobile conveyor.

There is a further need for an advanceable conveying system that can be constructed from relatively lightweight materials so that heavy duty and expensive equipment is not required to transport the components thereof and advance the system forward.

There is yet another need for an advanceable conveying system that can be safely used on irregular support surfaces such mine floors.

There is still another need for an advanceable conveying system that can be advanced with a minimal amount of interruption to the mining process.

SUMMARY OF THE INVENTION

In accordance with the particular preferred form of the present invention, there is provided an advanceable auxiliary conveying system adapted for use in connection with a mobile conveyor. The present conveying apparatus comprises a surface mountable trackway and an elevated roadway and conveying assembly that is adapted to support the mobile conveyor thereon and receive and convey the material discharged therefrom. The elevated roadway and conveying assembly is movably mounted to the trackway and is capable of moving between a first and a second elevated position. When in the first elevated position, the elevated roadway and conveying assembly is supported on the surface and the trackway is movably supported on the elevated roadway and conveying assembly above the surface so that the trackway may be advanced to a first advanced position with respect to the elevated roadway and conveying assembly. When in the second elevated position, the elevated roadway and conveying assembly is movably supported on the trackway above the surface so that the elevated roadway and conveying assembly may be advanced to a second advanced position on the trackway. The apparatus further comprises elevation members that are attached to the elevated roadway and conveying assembly and communicate with the trackway to selectively move the elevated roadway and conveying assembly between the first and second elevated positions. A ramp member also communicates with the elevated roadway and conveying assembly for permitting the mobile conveyor to access the elevated roadway from the surface. An advancing member is also provided for advancing the trackway to the first advanced position when the elevated roadway and conveying assembly is in the first elevated position. The advancing member also serves to selectively advance the elevated roadway and conveying assembly on the trackway to the second advanced position when the elevated roadway and conveying assembly is in the second elevated position.

Accordingly, it is an object of the present invention to provide an advanceable conveying apparatus for use in connection with mobile conveying apparatuses that does not include structure that may interfere with and possibly divert the flow of material as it is being received from the mobile conveying apparatus.

It is another object of the present invention to provide an advanceable conveying system that can be constructed from relatively lightweight structural components so that heavy duty and expensive apparatus is not needed to transport the system's components or advance the system forward in a predetermined direction.

Yet another object of the present invention is to provide an advanceable conveyor system that can be safely used on irregular support surfaces such as mine floors.

Still another object of the present invention is to provide an advanceable conveying system that can be advanced with a minimal amount of downtime.

Accordingly, the present invention provides solutions to the aforementioned problems associated with prior conveying systems. The reader will appreciate that these and other details, objects and advantages will become apparent as the following detailed description of the present preferred embodiments thereof proceeds.

BRIEF DESCRIPTION OF THE DRAWINGS

In the accompanying drawings, there is shown present preferred embodiments of the present invention wherein like reference numerals are employed to designate like parts and wherein:

FIG. 10 is a side elevational view of an elevation assembly of the present invention received on a present track assembly with the pivot plate thereof being pivoted to a first position;

FIG. 11 is a top view of the elevation assembly of FIG. 10;

FIG. 12 is a cross-sectional elevational view of the elevation assembly of FIG. 10 taken along line XII—XII in FIG. 10;

FIG. 13 is a cross-sectional elevational view of the elevation assembly of FIG. 10 taken along line XIII—XIII in FIG. 10;

FIG. 14 is a side elevational view of the elevation assembly of FIG. 10 with the pivot plate thereof being pivoted to a second position;

FIG. 24 is a side elevational view of the advanceable conveying apparatus of the present invention with the conveyor/roadway assembly thereof being supported on the mine floor in a first position while supporting a mobile conveyor thereon;

FIG. 25 is a side elevational view of the mobile conveyor and advanceable conveying apparatus of FIG. 24 with the ramp and trackway thereof being advanced to an extended position;

FIG. 26 is a side elevational view of the advanceable conveying apparatus and mobile conveyor of FIG. 25 with the conveyor/roadway assembly thereof being supported on the trackway; and FIG. 27 is a side elevational view of the advanceable conveying apparatus and mobile conveyor of FIG. 26 after the conveyor and roadway assembly has been advanced forward on the trackway.

DETAILED DESCRIPTION OF THE PREFERRED EMBODIMENTS

Figure 1:
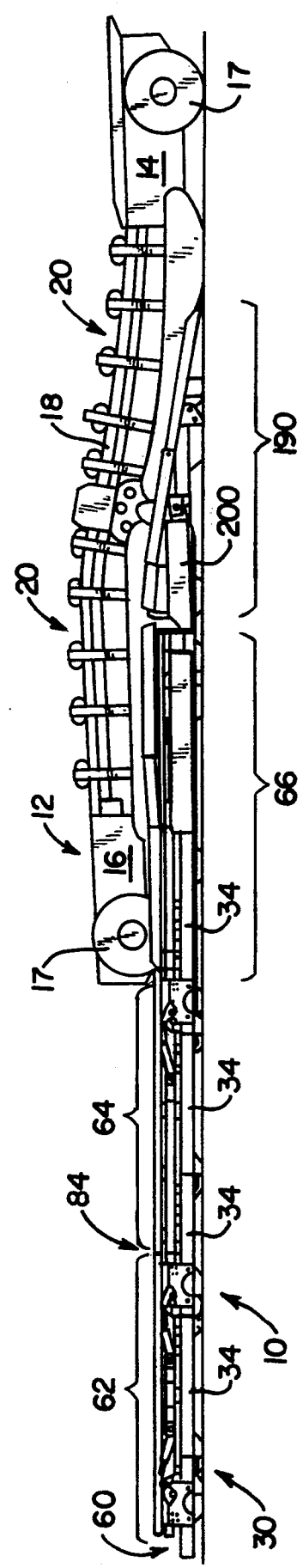
FIG. 1 is a side elevational view of the advanceable auxiliary conveying apparatus of the present invention with a mobile conveyor advancing thereon.

Referring now to the drawings for the purposes of illustrating preferred embodiments of the invention only and not for purposes of limiting the same, the Figures show an advanceable conveying apparatus generally designated as 10. More particularly and with reference to FIG. 1, the advanceable conveying apparatus 10 is well adapted for use with a mobile conveyor of the type shown and generally indicated as 12. While the mobile conveyor 12 is depicted in the Figures as comprising a mobile articulated conveyor such as the one disclosed in U.S. Pat. No. 4,852,724 to Bodimer, the disclosure of which is herein incorporated by reference, the skilled artisan will readily appreciate that the present conveying apparatus may be used in connection with a variety of different mobile conveyors. For example, the mobile conveyor 12 may be mounted on wheels and either be self-propelled or pulled along behind the mining machine (not shown). Similarly, the present conveying apparatus 10 may also be used in connection with mobile shuttle cars that are used to shuttle the mined material from the mining machine to a network of stationary conveyors located remote therefrom.

The mobile conveyor 12 depicted in the Figures has a material receiving ("inby") end 14 and a discharge ("outby") end 16 that are mounted on wheels 17. Extending between the inby end 14 and the outby end 16 is an endless belt conveyor 18 that is supported on a plurality of pivotally interconnected sections 20. See FIGS. 2 and 3. The interconnected sections 20 are propelled by a driven endless tram chain 22 that has a series of ground engaging tramming pads 24 attached thereto.

Figure 2:
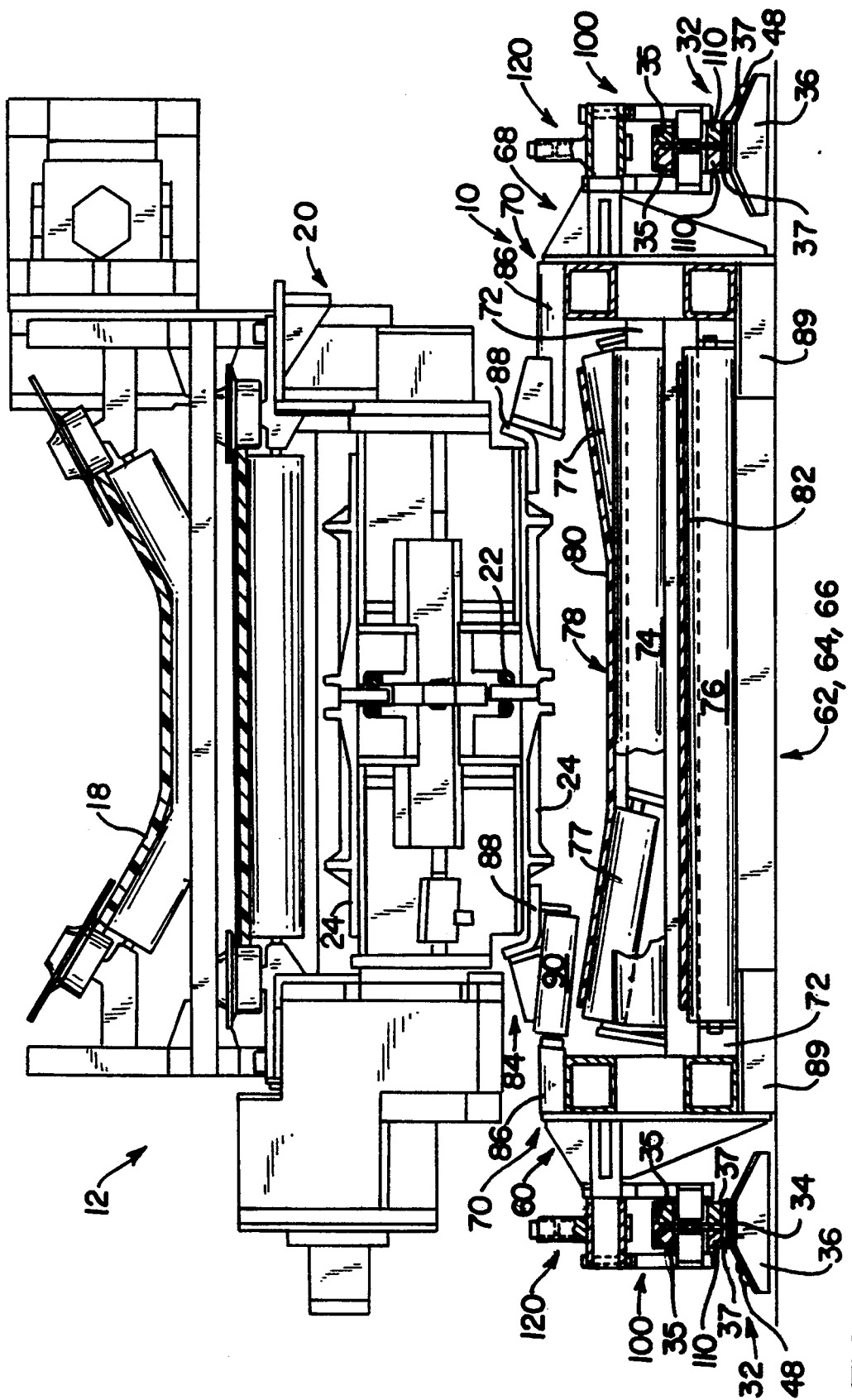
FIG. 2 is a partial cross-sectional end view of a conveyor/roadway assembly and trackway of the present invention with the conveyor/roadway assembly being supported on the mine floor.
Figure 3:
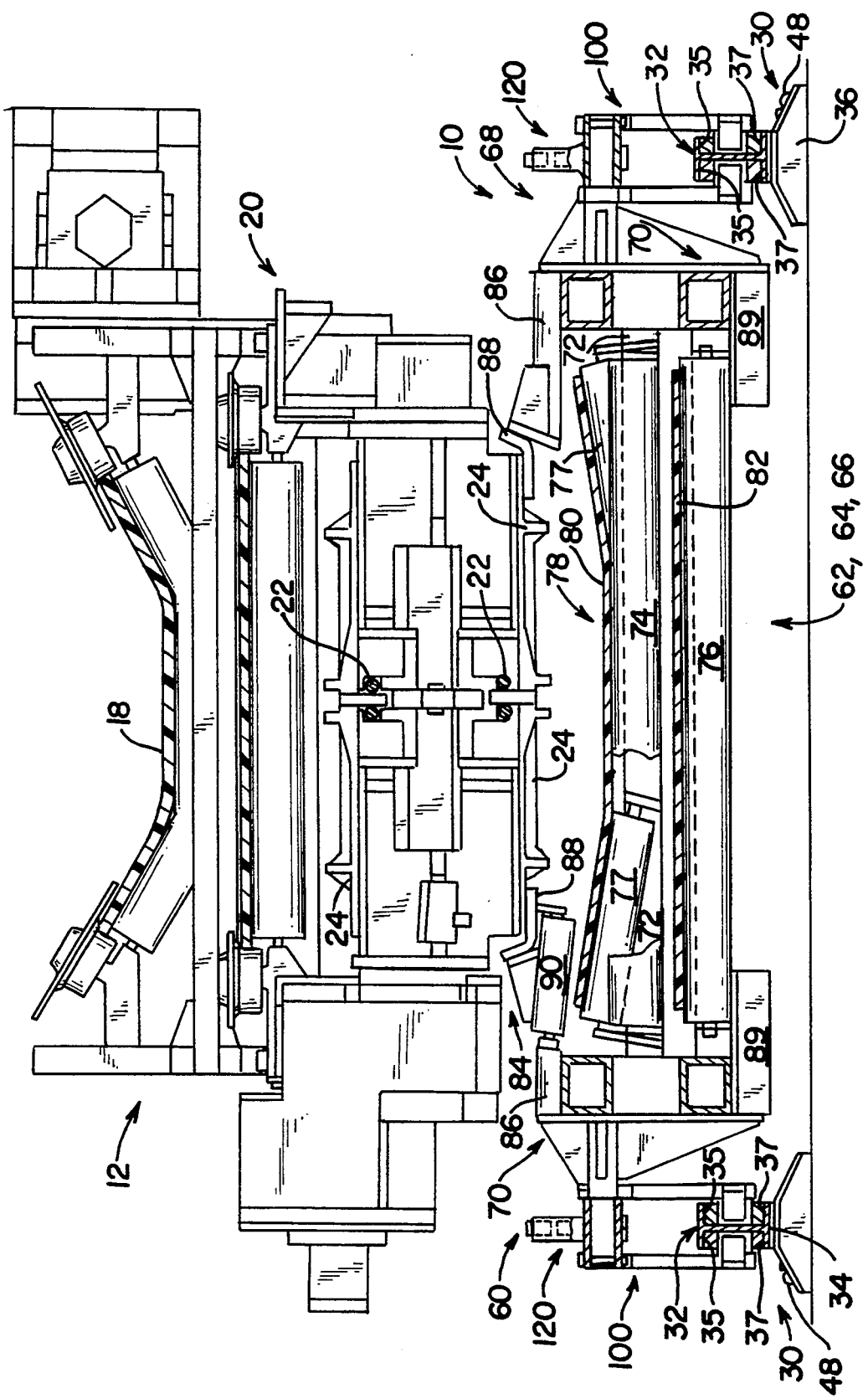
FIG. 3 is partial cross-sectional end view of the conveyor/roadway assembly and trackway of FIG. 2 with conveyor/roadway assembly being supported on the trackway.

The conveying system 10 of the present invention, in a preferred form, comprises a trackway 30 and a conveyor/roadway assembly, generally designated as 60, movably supported thereon. The trackway 30, preferably comprises two interspaced parallel rail assemblies 32 arranged as shown in FIGS. 2 and 3. In a preferred embodiment, each rail assembly 32 comprises a series of interconnected rail sections 34 that are fabricated from 59 inch long segments of 6 inch steel I-beam. See, FIGS. 1, 4, and 5. However, as the description of the preferred embodiments continues, those of ordinary skill in the art will readily appreciate that the rail sections 34 may be provided in a variety of different lengths and may be fabricated from a myriad of different structural materials such as, for example, C-channel.

Figure 5:
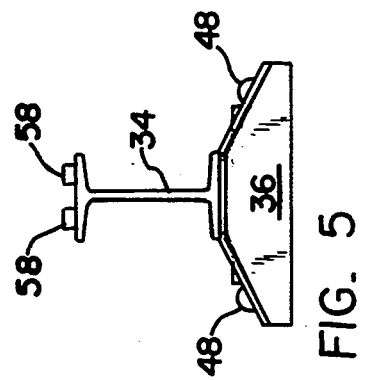
FIG. 5 is an end elevational view of the track section of FIG. 4.
Figure 6:
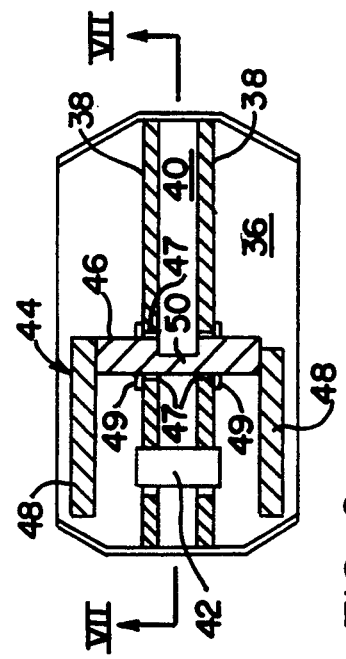
FIG. 6 is a cross-sectional plan view of the support pad and locking assembly of the track section of FIGS. 4 and 5 taken along line VI—VI in FIG. 5.

Each rail section 34 preferably has a load bearing pad member 36 attached to the one end thereof. See FIGS. 4–6. In a preferred embodiment, the pad member 36 is welded to the rail section 34; however, pad member 36 may be attached to the rail section 34 by any known fastening means adapted to withstand the abuse commonly encountered in underground mining operations. In addition, each pad member 36 preferably has attached thereto two spaced-apart lateral retaining members 38 that serve to define a longitudinal slot 40 that extends therebetween. See FIG. 6. To enable the rail sections 34 to be removably interlocked together without the use of hand tools, each rail section 34 is equipped with a manually engagable and disengagable locking assembly 44 that is rotatably attached to the lateral retaining members 38 as shown in FIG. 6.

The locking assembly 44 preferably comprises a transverse shaft member 46 that is fabricated from steel round stock that has a circular cross-sectional shape. The ends of the transverse shaft member 46 rotatably extend through bores 47 provided in the lateral retaining members 38 and have a corresponding handle member 48 attached thereto. In a preferred embodiment, the transverse shaft member 46 is laterally retained within the bores 47 by flat washers 49 that are welded to the transverse shaft 46 as shown in FIG. 6. The skilled artisan will appreciate, however, that the transverse shaft 46 may be rotatably fastened to the lateral retaining members 38 by a myriad of other known fastening methods. In addition, as can be seen in FIGS. 6–9, the central portion 50 of the transverse shaft member 46 is preferably notched such that it has a semicircular cross-sectional shape.

Figure 4:
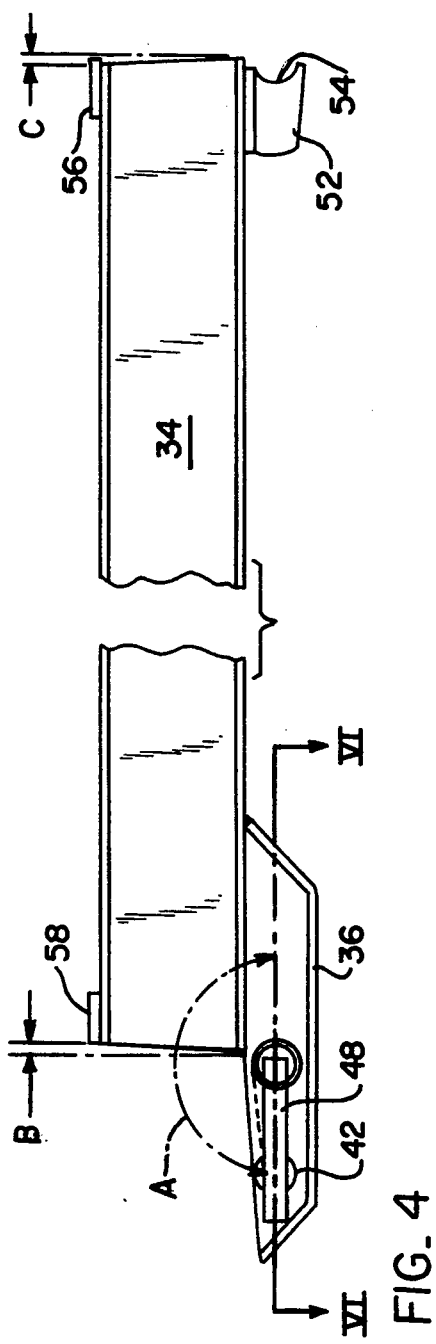
FIG. 4 is a side elevational view of a track section of the present invention.
Figure 8:
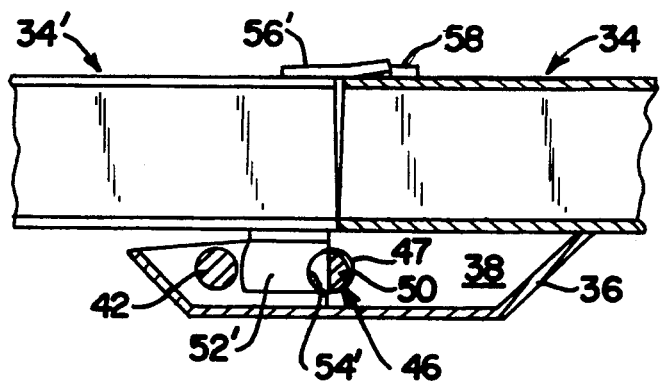
FIG. 8 is a partial side elevational assembly view of two track sections of the present invention with the transverse locking shaft of one track section being rotated to a first unlocked position.
Figure 9:
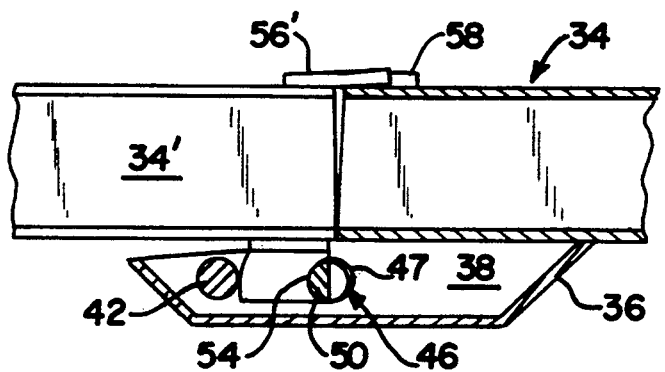
FIG. 9 is a partial side elevational assembly view of the track sections of FIG. 8 with the transverse locking shaft of one track section being rotated to a second locked position.

As shown in FIG. 4, each track section 34 has a downwardly extending retaining member 52 that is attached to the end thereof, preferably by welding. In a preferred embodiment, the retaining member 52 has a semi-circular notched portion 54 that is adapted to receive therein the semi-circular central portion 50 of the transverse shaft 46 of an adjoining track section 34. To assist in aligning adjoining track sections 34 during the assembly of each rail assembly 32, each track section 34 preferably has an outwardly extending tab member 56 attached to the upper flange thereof as shown in FIGS. 4, 8, and 9. The other end of each track section 34 has two, spaced-apart centering tabs 58 attached thereto that are adapted to receive the outwardly extending tab 56 of an adjoining track section 34 therein. In addition, both ends of each track section 34 are preferably cut on a slight angle (i.e., ¼" from vertical—designated as distances "B" and "C" in FIG. 4) to provide additional clearance for interconnection of the track sections 34 in end-to-end fashion as described below.

Figure 7:
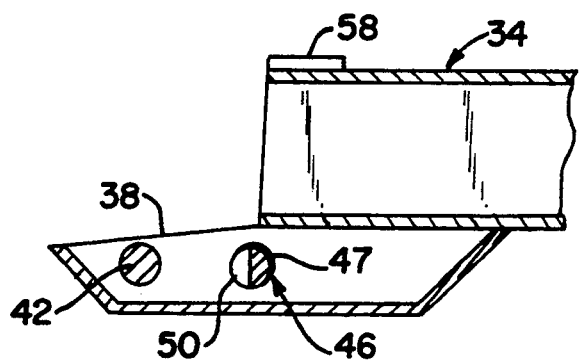
FIG. 7 is side elevational view of one end of a track section of the present invention with the transverse locking shaft thereof being rotated to a first unlocked position.

FIGS. 7-9 illustrate the method for interconnecting two adjoining track sections (34 and 34') together. To commence the connection process, the transverse shaft 46 of track section 34 is manually rotated to the position shown in FIG. 7 by handle 48. Thereafter, the outwardly extending tab member 56' of track section 34' is aligned with the alignment tabs 58 on the track section 34 and the retaining member 52' of track section 34' is inserted into the slot 40 (see FIG. 6) of track member 34. See FIG. 8. When the track sections 34 and 34' are in longitudinal alignment, the notched portion 54' of retaining member 52' will be in position to receive the central portion 50 of transverse shaft 46 therein and the outwardly extending tab member 56' will be received between the alignment tabs 58. Once the track sections 34 and 34' are aligned, the transverse shaft 46 is rotated (by means of handle 48—see FIG. 6) to the position shown in FIG. 9. The skilled artisan will appreciate that by rotating the semicircular central portion 50 of the transverse shaft 46 into the notched portion 54' of the retaining member 52' the track sections 34 and 34' will be locked together in alignment. As can be seen in FIG. 6, a cross support member 42 is rigidly fastened to the lateral retaining members 38 such that it extends therebetween in slot 40 to limit the longitudinal travel of the retaining member 52' when it is received in slot 40.

To disconnect the track sections 34 and 34', the transverse shaft 46 of the track section 34 is rotated to the position shown in FIGS. 7 and 8 thereby disengaging the central potion 50 of the transverse shaft 46 from the retaining member 52'. It will be further appreciated that the above-described track assembly 32 may be manually assembled and disassembled without hand tools and may be quickly extended simply by adding additional track sections in the manner described above. In addition, to prevent the handle members 48 from accidentally being jarred or rotated to a position wherein the track sections 34 may be disconnected from one another, retaining clips (not shown) may be attached to each pad member 36 to retain the handle members 48 in the locked positions described above. Those of ordinary skill in the art will understand that the track members may also comprise a variety of different structural materials that may be interconnected by a myriad of known fastening arrangements.

The conveyor/roadway assembly 60 of the present invention will now be described with specific reference being made to FIG. 1 wherein it can be ascertained that the present conveyor/roadway assembly 60 preferably comprises a head conveyor/roadway section 62, at least one intermediate conveyor/roadway section 64, and a tail conveyor/roadway section 66 that are adapted to be interconnected together, in end-to-end fashion. The reader will appreciate that, although FIG. 1 illustrates the present conveyor/roadway assembly 60 as including only one intermediate section 64, a number of intermediate sections 64 may be employed to extend the overall length of the assembly 60.

Except for the differences that will be discussed in detail below, the roadway and conveyor portions of the head section 62, the intermediate sections 64, and the tail section 66 of the conveyor/roadway assembly 60 are preferably constructed in a similar manner. As can be seen in FIGS. 2 and 3, each section 62, 64, and 66 of the conveyor/roadway assembly 60 has a frame member 68 that is preferably fabricated from steel plate, angle, and tubing that can withstand the abuse commonly associated with underground mining operations.

The frames 68 of each of the conveyor/roadway sections 62, 64, and 66 comprise two lateral side structures 70 that are interconnected by a plurality of lower cross braces 72. Attached to the lower cross braces 72, in a known manner, are belt supporting rollers 74 and 76 for supporting an endless conveyor belt 78 of known construction thereon. As illustrated in FIGS. 2 and 3, endless conveyor belt 78 has an upper run 80 and a lower run 82. Upper run 80 is movably supported on rollers 74 and lower run 82 is movably supported on rollers 76. In a preferred embodiment, additional upper rollers 77 are attached to the cross braces 72 to "trough" the upper run 80 of the belt 78 in a known manner. Such troughing serves to cause the bulk of the conveyed material to gravitate to the center of the belt 78. The skilled artisan will readily appreciate that the conveying apparatus 10 of the present invention is adapted for use in connection with known endless belt storage apparatuses (not shown) that contain the drive rollers for the belt 78 and can selectively store and release additional lengths of belt 78 as the conveyor network is extended. Such apparatus also serves to drive the belt in an endless orbit on the rollers 74, 76, and 77 thereby causing the material discharged upon the upper run 80 thereof to be conveyed to a desired location (i.e., into another stationary conveyor or to an off-loading area).

Attached to each side structure 70 and extending above the upper run 80 of the belt 78 is an elevated roadway, generally designated as 84, for supporting the mobile Attached to each side structure 70 and extending above the upper run 80 of the belt 78 is an elevated roadway, generally designated as 84, for supporting the mobile conveyor 12 thereon. In particular, the elevated raodway 84 preferably comprises a plurality of inwardly extending strut portions 86 that are attached to the side member 70, preferably by welding, as shown in FIGS. 2 and 3. Attached and supported on the strut portions 86 are segments of track angle 88 that are adapted to receive and guide the tramming pads 24 of the mobile conveyor 12 thereon. As such, the track angles 88 that are attached to the head section 62, the intermediate sections 64, and the tail section 66 of the conveyor/roadway assembly 60 cooperate to form the elevated roadway 84 that extends above the endless belt 78. In addition, to prevent the belt 78 from contacting the strut portions 86 which could cause excessive belt wear, upper belt rollers 90 are attached to the track angles 88 located on each of the conveyor/roadway sections 62, 64, and 66. FIGS. 2 and 3 illustrate that rollers 90 are attached to the struts 86 only along one side of the elevated roadway 84; however, those of ordinary skill in the art will understand that rollers 90 are also preferably attached to the struts 86 along the other side of the elevated roadway 84 as well. The skilled artisan will also appreciate that the elevated roadway 84 of the present invention does not comprise structure that extends between the mobile conveyor 12 and the upper run 80 of belt 78 that could cause conveyed material to be aberrantly discharged from the conveyor assembly 10 as does other known conveying apparatuses.

As can be seen in FIGS. 2 and 3, the conveyor/roadway assembly 60 of the present invention is movable between a first elevated position wherein the conveyor/roadway assembly 60 is supported upon the mine floor on a collection of load bearing pad members 89 that are attached to the frames 68 of the conveyor/roadway sections 62, 64, and 66 (FIG. 2) and a second elevated position wherein the conveyor/roadway assembly 60 is movably supported above the mine floor on the rail assemblies 32 (FIG. 3). In a preferred embodiment, the elevational displacement of the conveyor/roadway assembly 60 between the first and second elevated positions is selectively controlled by means of elevation assemblies 100 that are fastened to each of the side structures 70 of the sections 62, 64, and 66 of the conveyor/roadway assembly 60. As can be seen in FIGS. 2, 3, and 10-14, each elevation assembly 100 preferably comprises a wheeled carriage assembly 102 that is adapted to rollably travel upon the corresponding continuous rail assemblies 32 to movably support the roadway/conveyor assembly 60 on the trackway 30. The skilled artisan will, of course, appreciate that the carriage assemblies 102 may be fabricated in a myriad of configurations corresponding with the structural components comprising the rail sections 32. For example, carriages 102 may comprise skid pads that are adapted to be movably displaced upon a track that is fabricated from steel channel or from a track structure that has wheels mounted thereto.

In a preferred embodiment, each wheeled carriage assembly 102 comprises two side plates 104 that are interconnected in a spaced-apart relationship by a plurality of spacers 106 that are received on corresponding bolts 108. Spacers 106 are sized to enable the carriage assembly 102 to straddle the rail assembly 32 upon which it is riding as can be most particularly seen in FIGS. 12 and 13. Attached to each side plate 104 are preferably two wheels 110 that are adapted to ride upon the upper inside surfaces 35 and lower inside surfaces 37 of the flanges of the corresponding rail assembly 32. See FIGS. 2, 3, 12, and 13. I have found that 5" diameter wheels work particularly well with the 6" I-beam comprising the preferred rail assembly 32; however, wheels 110 should be sized to be compatible with the configuration and size of rail material being used. The wheels 110 are preferably received on a corresponding sleeve bearing 112 that is received on a shaft 114 that is rigidly attached to a corresponding side plate 104. See FIGS. 12 and 13.

A plurality (the preferred number will be discussed in detail below) of wheeled carriage assemblies 102 are preferably pivotally attached to each of the side structures 70 of the sections 62, 64, and 66 of the roadway/conveyor assembly 60 by corresponding bell crank assemblies 120. As can be seen in FIGS. 10-14, each bell crank assembly 120 preferably comprises a hydraulically (or pneumatically) actuated elevational cylinder member 122 that has a selectively extendable piston 124 therein.

As can be seen in FIGS. 16-21, the end of each cylinder member 122 is pivotally pinned in a known manner to a corresponding outwardly extending brace 85 that is rigidly attached to a corresponding side structure 70. As can be most particularly seen in FIGS. 10, 11, and 14, the end of each piston 124 is pivotally pinned to a corresponding pivot plate 126 by means of a clevis 128 and a removable clevis pin 129.

The pivot plate 126 is preferably configured as shown in FIGS. 10 and 14 and has a sleeve member 130 attached thereto that is pivotally received on an outwardly extending shaft 132 that is rigidly attached to a corresponding side structure 70. Preferably, the shaft 132 is welded to the corresponding side structure 70 and is laterally and vertically supported by gussets 133 as shown in FIG. 12. Sleeve member 130 is preferably rotatably retained on shaft 132 by a collar member 134 that is pinned to shaft 132 by a bolt 136. See FIGS. 12 and 14. As such, it will be appreciated that sleeve member 130 is free to pivot about axis "D—D" when the piston 124 is selectively extended or retracted. See FIG. 12.

Those of ordinary skill in the art will understand that the above-described construction enables the pivot plate 126 to be pivoted between a first (lowered) position (FIGS. 3 and 10) and a second (raised) position (FIGS. 2 and 14). When the pivot plate 126 of an elevation assembly 100 is pivoted to the first position, the corresponding shaft member 132 is received in cradles 127 provided in each of the side plates 126 and the conveyor/roadway assembly 60 will be supported on the mine floor and the rail assemblies 32 will be suspended above the mine floor by the carriage assemblies 102. See FIG. 2. Conversely, when the pivot plate 126 is pivoted to the second position, the rail assemblies will be supported on the mine floor and the conveyor/roadway assembly 60 will be rollably supported above the mine floor on the rail assemblies 32. See FIG. 3.

Figure 15:
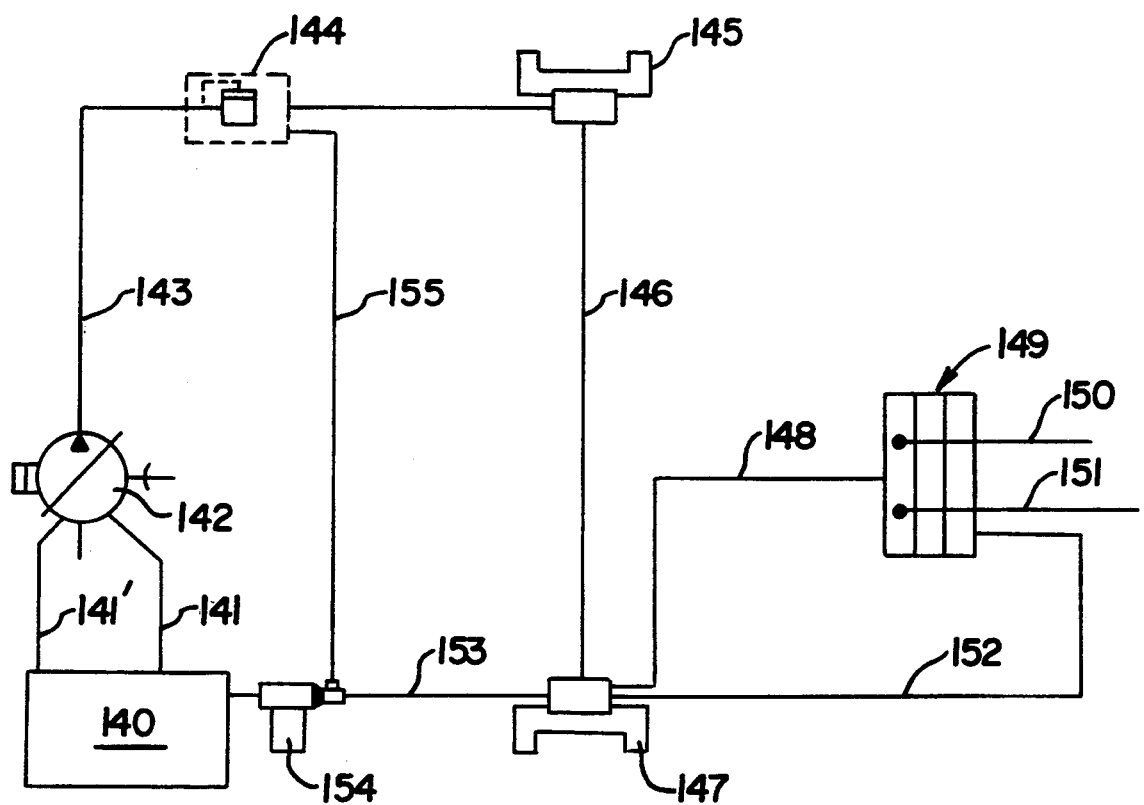
FIG. 15 is schematic drawing of the hydraulic system for controlling the elevation cylinders of the present invention.

FIG. 15 is a hydraulic schematic representation of a preferred hydraulic system for controlling the operation of the elevation cylinders 122 in the manner described above. As can be seen in that Figure, the hydraulic fluid is pumped under pressure from a hydraulic fluid reservoir 140 through hydraulic line 141 by a pump 142. Preferably, a second hydraulic line 141' is attached between pump 142 and the hydraulic fluid reservoir 140 to enable hydraulic fluid to be returned from the pump 142 to the reservoir 140 as desired. Pump 142 pumps the pressurized fluid through hydraulic line 143 to a relief valve 144 and into a first manifold 145. The first manifold 145 distributes the pressurized fluid through hydraulic line 146 to a second manifold 147 which transfers the pressurized fluid, through hydraulic line 148, to a manually operated valve 149. By manually actuating valve 149 to a first position, pressurized fluid is permitted to flow through hydraulic line 150 to cylinders 122 which causes the pistons 124 thereof to be extended. See FIG. 14. Conversely, by manually actuating the valve 149 to a second position, pressurized fluid is permitted to flow through hydraulic line 151 to the cylinders 122 attached thereto such that the pistons 124 thereof are retracted. See FIG. 10. Fluid is returned from the valve 149 through hydraulic line 152, into the manifold 147, through a hydraulic line 153 that is connected to a commercially available filter 154 which is ultimately fluidly connected to the reservoir 140. If the fluid pressure exceeds a predetermined magnitude (preferably 1200 psi) in hydraulic line 143, the relief valve 144 permits fluid to return to the filter 154 through hydraulic line 155 and ultimately into the reservoir 140. While the hydraulic schematic described above is particularly well adapted for controlling the cylinders 122 which, as will be discussed in detail below, control the elevation of the conveyor/roadway assembly 60, the skilled artisan will appreciate that a myriad of other hydraulic systems may be used to control cylinders 122.

The preferred elevation assemblies and rack configuration described above enables the conveyor/roadway assembly 60 to be supported on the continuous rail assemblies 32 during the advancement thereof. Unlike other known conveyor arrangements that utilize individual cylinders to lift the conveyor above the mine floor during the advancement thereof, the present conveyor apparatus 10 distributes the weight of the conveyor/roadway assembly 60 and the mobile conveyor 12 riding thereon on the continuous rail assemblies 32 which can transverse across irregularities in the mine floor. As such, the present invention provides a much more stable system during the advancement thereof than other known conveying systems.

As mentioned above, a preferred conveyor/roadway assembly 60 comprises a head conveyor/roadway section 62, at least one intermediate conveyor/roadway section 64, and a tail conveyor/roadway section 66 that are inteconnected together, in end-to-end fashion, as shown in FIG. 1. While the general construction of a preferred head conveyor/roadway section 62, an intermediate conveyor/roadway section 64 and the tail conveyor/roadway section 66, is depicted FIGS. 2 and 3, the specific preferred arrangements of the components depicted in those Figures are illustrated in FIGS. 16–21.

Figure 16:
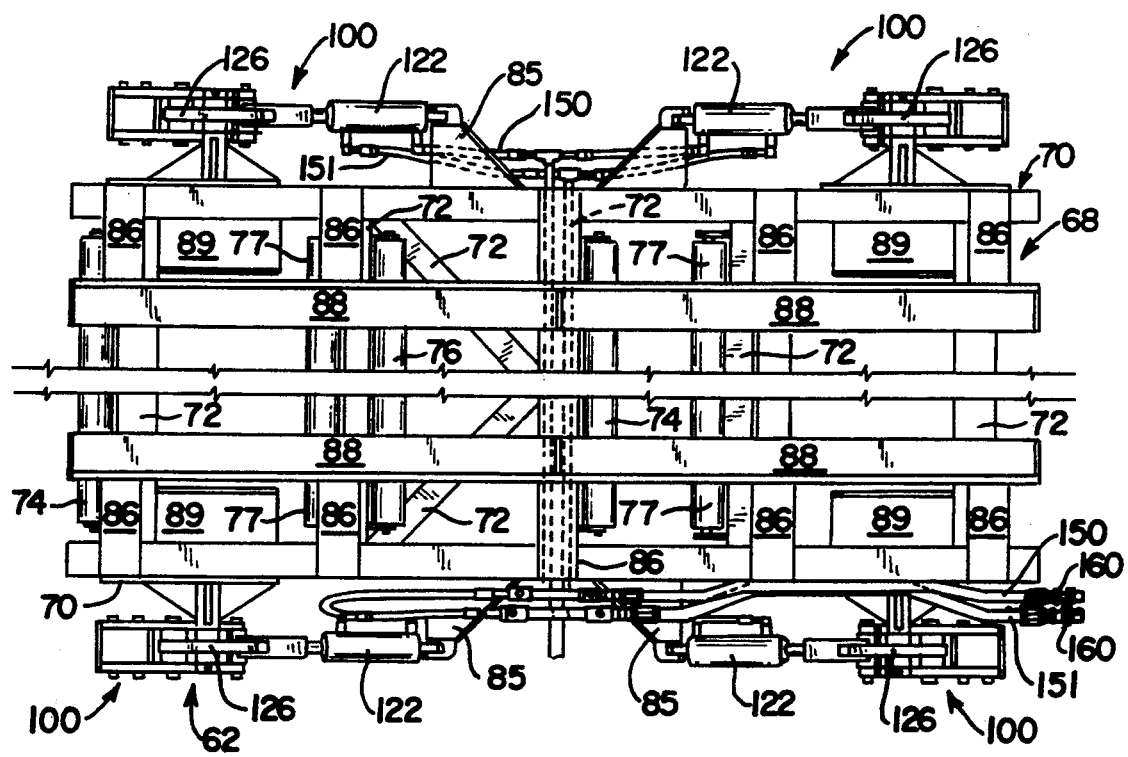
FIG. 16 is a top view of a head conveyor/roadway section of the present invention.
Figure 17:
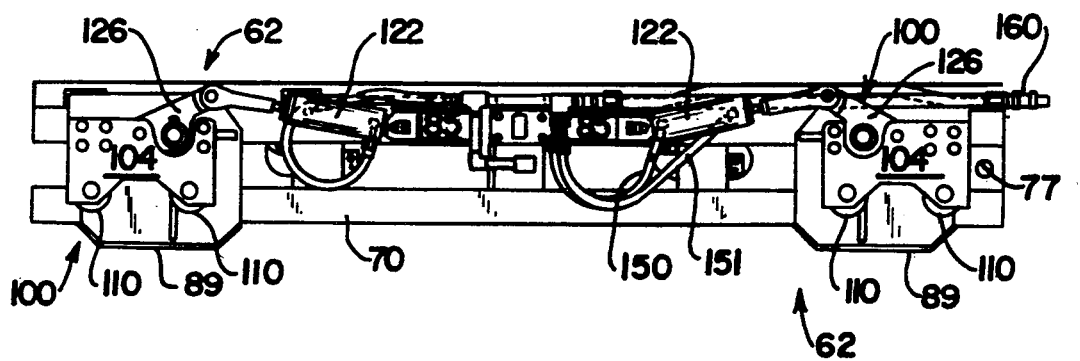
FIG. 17 is a side elevational view of the head conveyor/roadway section of FIG. 16.

In particular, the frame 68 of a preferred head conveyor/roadway section 62 is configured as shown in FIGS. 16 and 17 and has four elevation assemblies 100 attached thereto for moving the section 62 between the first and second elevated positions depicted in FIGS. 2 and 3. FIGS. 16 and 17 also illustrate the preferred method of routing the hydraulic hoses 150 and 151 to the cylinders 122 of the elevation assemblies 100 for supplying pressurized hydraulic fluid thereto.

Figure 18:
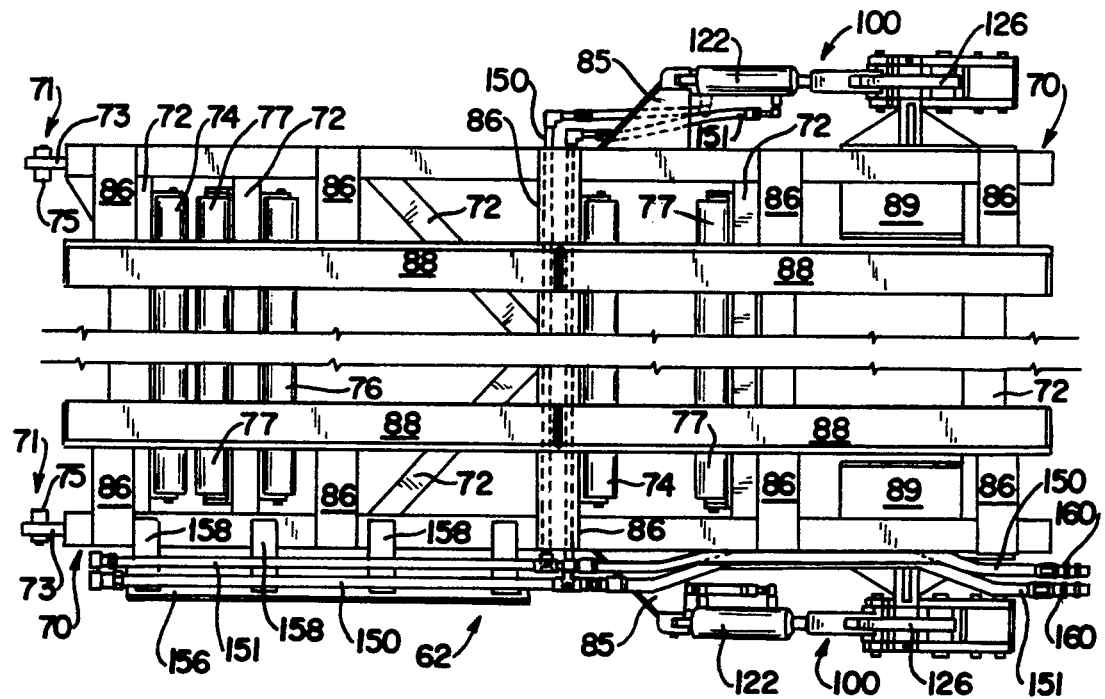
FIG. 18 is a top view of an intermediate conveyor/roadway section of the present invention.
Figure 19:
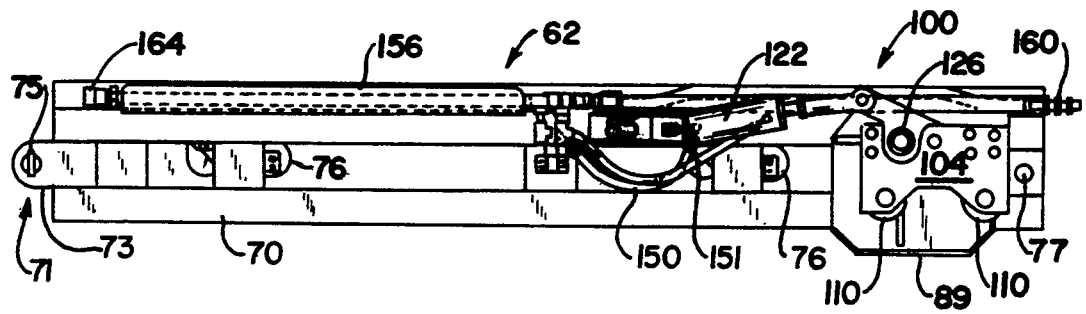
FIG. 19 is a side elevational view of the intermediate conveyor/roadway section of FIG. 18.
Figure 20:
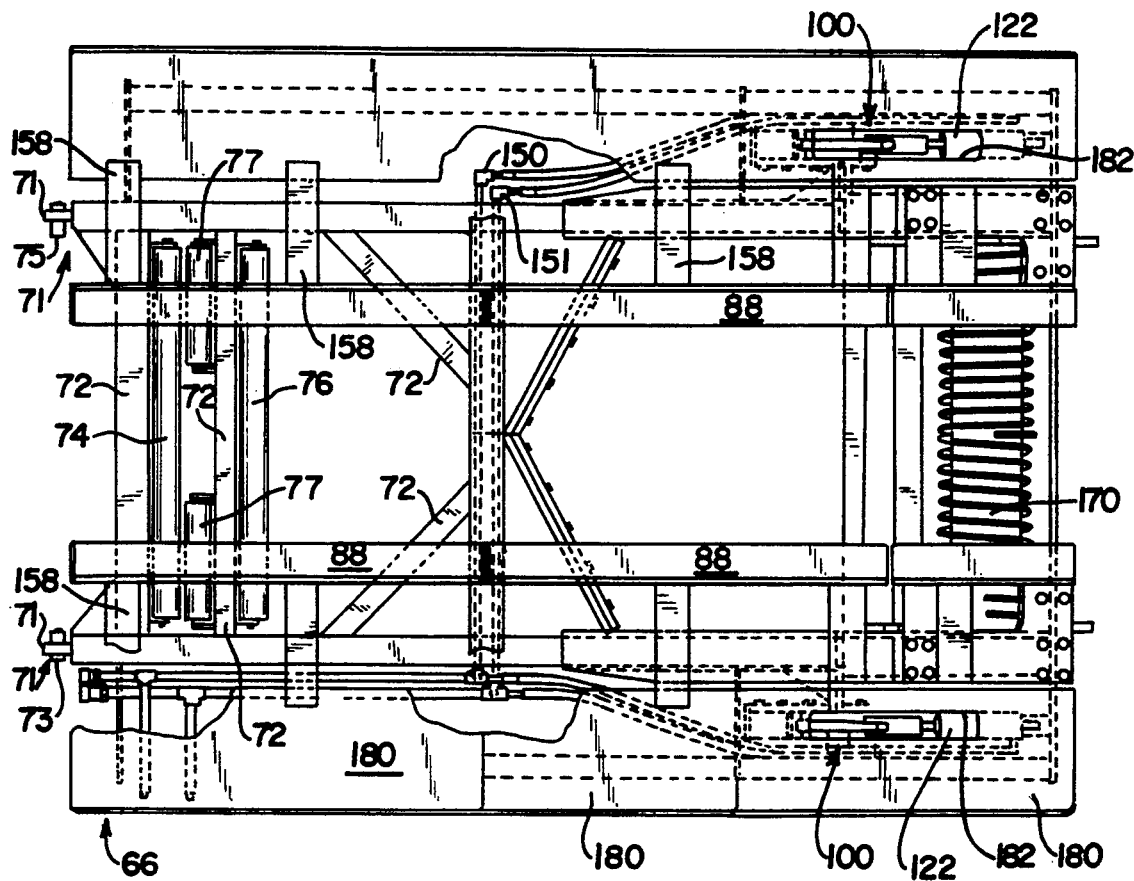
FIG. 20 is a top view of the tail conveyor/roadway section of the present invention.
Figure 21:
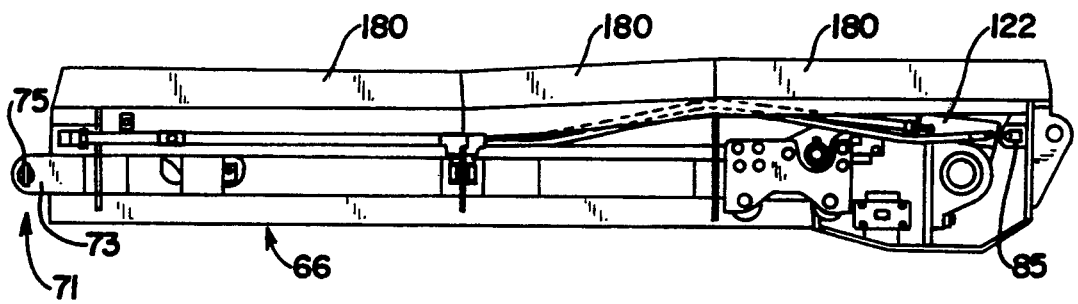
FIG. 21 is a side elevational view of the tail conveyor/roadway section of FIG. 20.

FIGS. 18 and 19 depict a preferred configuration of an intermediate conveyor/roadway section 64. As can be seen in those Figures, two elevation assemblies 100 are utilized to move the section 64 between the first and second elevated positions. Similarly, FIGS. 20 and 21 depict a preferred tail conveyor/roadway section 66. In a preferred embodiment, two elevation assemblies 100 are utilized to move the section 66 between the first and second elevated position. As can be seen in FIGS. 20 and 21, a preferred tail conveyor/roadway section 66 is also equipped with an idler pulley 170 for rotatably supporting the belt 78 thereon. In addition, the tail conveyor/roadway section 66 also preferably has wheel supporting ramp plates 180 attached thereto along the sides thereof. It will be understood that ramp plates 180 are adapted to support the wheels 17 of the mobile conveyor 12 as the tramming pads 24 thereof are advanced onto the elevated roadway 84. As can be seen in FIG. 20, the portions of the ramp plates 180 that are above the bell crank assemblies 120 have slots 182 therein to provide the bell crank assemblies 120 with adequate clearance when the pistons 124 thereof are extended.

As can be seen in FIGS. 16–21 conveyor/roadway sections 62, 64, and 66 are adapted to be quickly interconnected together in end-to-end fashion by pin assemblies, generally designated as 71. In particular, each intermediate conveyor/roadway section 64 and the tail conveyor/roadway section 66 are preferably equipped with two outwardly extending connection members 73 that are attached to the side structures 70 thereof as shown in FIGS. 18–21. Each connection member 73 has a bore therethrough (not shown) that is adapted to receive a corresponding removable connection pin 75 therein. Similarly, the head conveyor/roadway section 62 and each intermediate conveyor/roadway section 64 have two corresponding pin receiving bores 77 through the side structures 70 thereof as shown in FIGS. 17 and 19. To removably interconnect the head conveyor/roadway section 62 to an adjacent intermediate roadway/conveyor section 64, the bores in the connection members 73 are coaxially aligned with corresponding bores 77 provided in the side structures 70 of the head conveyor/roadway section 62 and the corresponding connection pins 75 are inserted therein and are locked in position by removable cotter pins (not shown). Likewise, to removably interconnect the tail conveyor/roadway section 66 to an adjacent intermediate conveyor/roadway section 64, the bores 77 in side structures 70 of the intermediate section 64 are coaxially aligned with the bores in the connection members 73 that are attached to the tail section 66. Thereafter, the connection pins 75 are inserted therein in the manner described above. As such, the skilled artisan will readily appreciate that the aforementioned pin assemblies 71 permit the conveyor/roadway sections 62, 64, and 66 to be quickly pivotally interconnected. It will be further appreciated that when connected in end-to-end fashion as described above, the elevated tracks 88 of each conveyor/roadway section 62, 64, and 66 cooperate to form the continuous elevated roadway 84 upon which the mobile conveyor can travel. It will also be appreciated that the belt 78 is extended from a known belt storage and drive/apparatus and is operatively supported under the elevated roadway 84 on the collection of rollers 74, 76, 177, and 190 in the manner described above. The storage and drive apparatus serves to drive the belt 78 in an orbit on rollers 74, 76, 77, and 170 to thereby enable the belt 78 to receive and convey the mined material from the mobile conveyor 12 to a predetermined discharge point.

Also, to further facilitate quick interconnection of the conveyor/roadway sections 62, 64, and 66, commercially available "quick-disconnect" fittings 160 are preferably connected to the hoses (150, 151) as shown in FIGS. 16 and 17. Such fittings permit the hoses of one section to be quickly interconnected with the hoses of an adjoining section to thereby form a preferred hydraulic system as depicted in FIG. 15.

Figure 22:
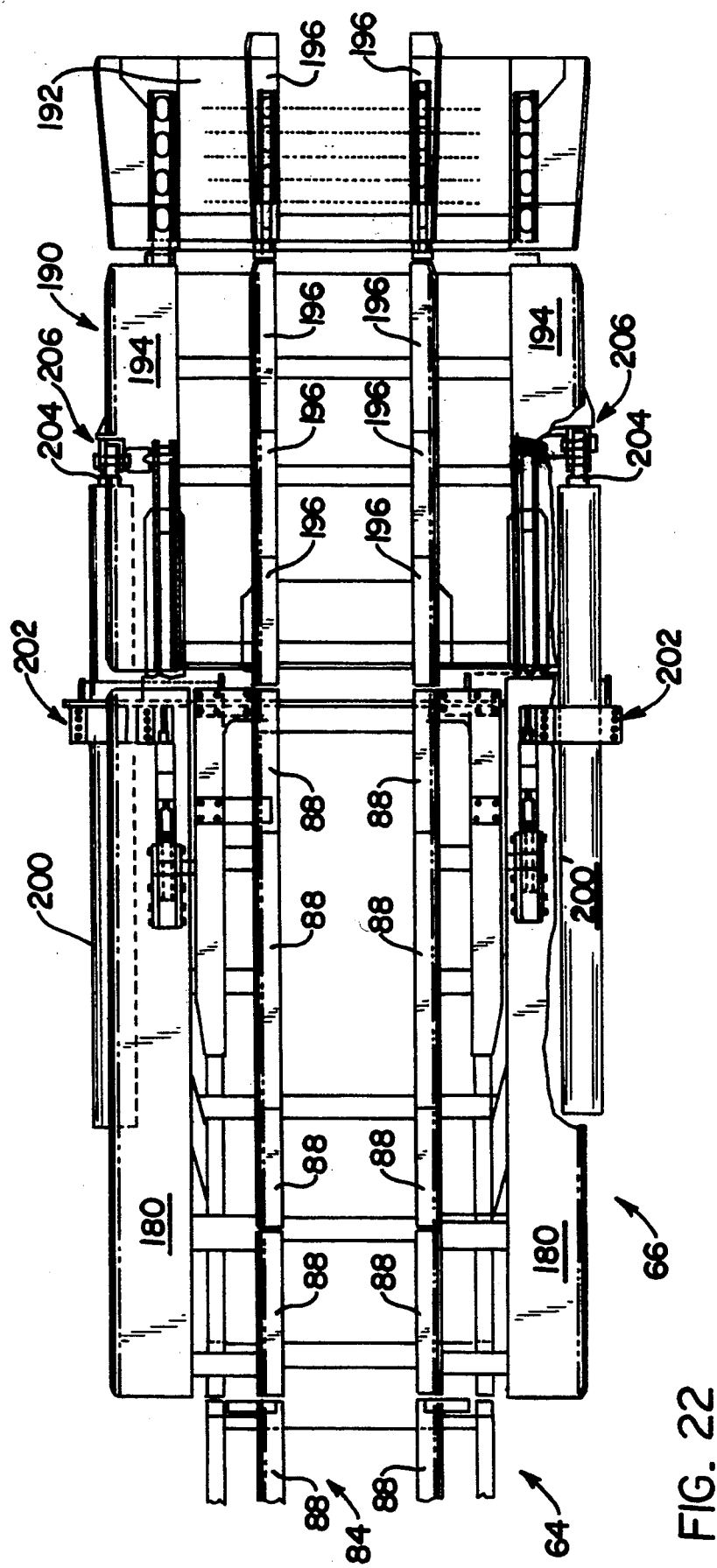
FIG. 22 is a top view of the tail conveyor/roadway section of the present invention connected to the extendable ramp of the present invention.

The conveying apparatus 10 of the present invention also includes an extendable ramp section 190 that is preferably interconnected to the tail conveyor/roadway section 66 by extendable cylinders 200. See FIG. 1. Also in a preferred embodiment, the rail assemblies 34 are pivotally attached (preferably pinned) to the ramp section 190 such that when the ramp section 190 is advanced with respect to the conveyor/roadway assembly 60, the rail assemblies 32 travel with the ramp section 190. The ramp structure 190 is preferably constructed from heavy duty (i.e., 0.75" thick) steel plate adapted to support the mobile conveyor 12 as it trams thereon and is also preferably equipped with a cleated end portion 192 that is pivotally pinned thereto in a known manner. See FIG. 22. The ramp section 190 is also preferably provided with wheel support plates 194 for supporting the wheels 17 of the mobile conveyor 12 thereon. In addition, the ramp section 190 is preferably equipped with rail sections 196 that are adapted to receive and guide the tramming pads 24 of the mobile conveyor 12 onto the elevated track sections 88 of the tail conveyor/roadway section 66.

As mentioned above, the ramp section 190 may be connected to the tail conveyor/roadway section 66 by two extendable cylinders 200 and 200'. Preferably, cylinders 200 and 200' are each connected to a corresponding side structure 70 of the tail conveyor/roadway section 66 by a corresponding commercially available pillow block bearing 202 that provides a predetermine range of movement to the corresponding cylinder (200, 200') with respect to the tail section 66. Each cylinder (200, 200') has an extendable piston 204 therein that is pivotally attached to the ramp structure 190 in a known manner by means of a clevis and pin arrangement generally indicated as 206. In a preferred embodiment, cylinders (200, 200') are hydraulically controlled and have an extendable piston that is 10' long; however a variety of different extendable and retractable cylinders may also be used.

Figure 23:
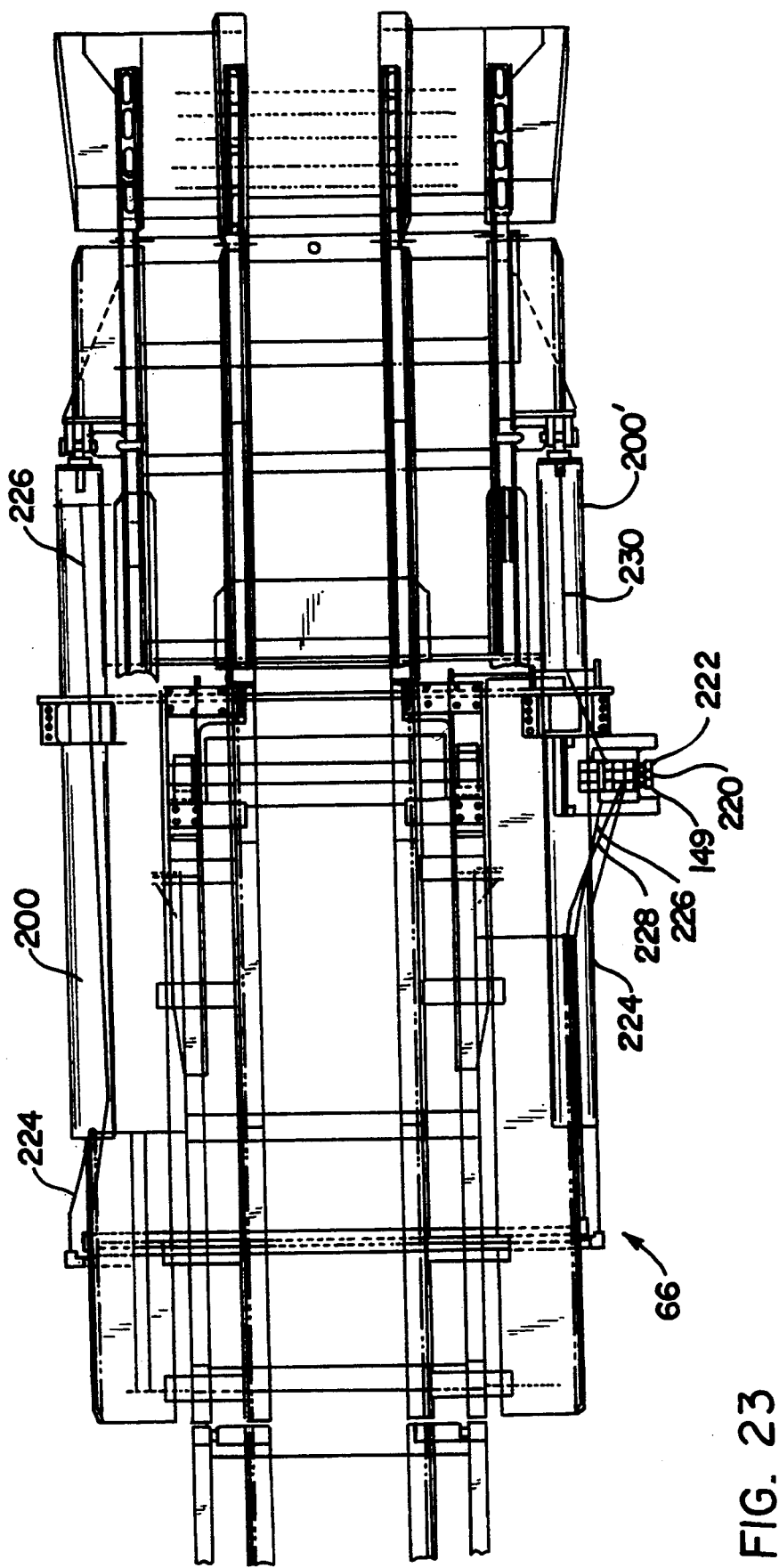
FIG. 23 is a schematic drawing of the hydraulic operating system for controlling the ramp extension cylinders of the present invention.

FIG. 23 illustrates a preferred hydraulic system for controlling the cylinder 200. As can be seen in that Figure, commercially available manually operated valves 220 and 222 are preferably used to control the operation of cylinders (200, 200'). In particular, valve 220 is utilized to control the extension and retraction of cylinder 200 in a known manner through lines 224 and 226, respectively. Similarly, valve 222 is used to extend and retract cylinder 200' in a known manner through lines 228 and 230, respectively. Preferably, valves 220 and 222 are independently operable such that cylinders (200, 200') may be extended and retracted to different positions at different times in order to skew the ramp section 190 and the rail assemblies 32 attached thereto in a desired direction. As such, this preferred arrangement permits the operator to actually control the direction in which the elevated roadway and conveyor assembly 60 is advanced.

The skilled artisan will appreciate that other cylinder arrangements and hydraulic systems may be successfully used to control the advancement of the present conveying system. For example, valves 220 and 222 could comprise commercially available electronic solenoid valves that are radio controlled by an operator or computer located remote therefrom. Moreover, other apparatuses such as, for example, rack and pinion gear assemblies may also be used to move the ramp section 190 between a first position (FIGS. 24 and 27) and a second extended position (FIGS. 25 and 26). It will also be understood that ramp section 190 may be self-propelled. For example, the ramp section 190 may comprise a track-mounted ramp car such as that disclosed in U.S. Pat. No. 4,969,691 to Moore, the disclosure of which is herein incorporated by reference, and utilize a winch to advance the rail assemblies 32 and the elevated roadway and conveyor assembly 60 to predetermined positions.

The operation of the conveying apparatus 10 of the present invention can be understood from reference to FIGS. 1–3 and 24–27. To advance the conveying apparatus 10 forward (in the direction of arrow "E" in FIG. 24) to a predetermined position, the pistons 124 of the elevation cylinders 122 are retracted to the position illustrated in FIG. 10 such that the conveyor/roadway assembly 60 is supported on the mine floor and the rail assemblies 32 are rollably supported on the wheels 110 of the elevation assemblies 100. See FIG. 1. Thereafter, the mobile conveyor assemblies 100. See FIG. 2. Thereafter, the mobile conveyor 12 is moved onto the elevated roadway 84 (FIG. 1) until it is entirely received thereon such that the front wheels 17 thereof are not received on the ramp section 190 (FIG. 24). Then, the end portion 192 of the ramp section 190 is pivoted to the position shown in FIG. 24 and the ramp extension cylinders 200 are extended to advance the ramp section 190 forward (in the direction depicted by arrow "E" in FIG. 25). As can be seen in FIG. 25, because the end of the rail assemblies 32 are attached to the ramp section 190, the rail assemblies 32 are advanced forward therewith. It will be appreciated that rail assemblies 32 are rollably supported above the min surface on the wheels 110 of the elevation assemblies 100 thereby enabling the rail assemblies 32 to be rollably advanced forward as the ramp section 190 is extended. After the ramp extension cylinders 200 have been extended to the desired position, the pistons 124 of the elevation cylinders 122 are extended (FIG. 14) thereby causing the conveyor/roadway assembly 60 to be elevated above the mine floor and be rollably supported on the rail assemblies 34. See FIGS. 3 and 26. Thereafter, the piston 204 of the cylinder 200 is retracted thereby causing the conveyor/roadway assembly 60 to be rollingly advanced forward to the ramp section 190 as shown in FIG. 27.

After the conveyor/roadway assembly 60 has been advanced forward in the above-described manner, the end portion 192 of the ramp section 190 is returned to the position illustrated in FIG. 1 so that the mobile conveyor 12 may be moved onto the mine floor to trail behind the mining machine. It will be understood, however, that the discharge end 16 of the mobile conveyor 12 will remain on the conveyor/roadway assembly 60 so that it may discharge the mined material thereupon.

As can be appreciated from the description above, the present invention addresses many of the problems commonly encountered with known conveying systems. In particular, the present conveyor/roadway assembly 60 does not have cross braces and other structure that can inhibit the flow of discharged material from the mobile conveyor. Moreover, the novel construction of the conveyor/roadway assembly of the present invention enables the conveying system to be quickly and safely advanced over irregular mine floor surfaces. In addition, expensive self propelled ramp and tail pieces are not required to advance the system forward. Those of ordinary skill in the art will, of course, appreciate that various changes in the details, materials and arrangements of parts which have been herein described and illustrated in order to explain the nature of the invention may be made by those skilled in the art within the principle and scope of the invention as expressed in the appended claims.

I claim:

1. Apparatus for receiving and conveying material from a mobile conveyor adapted for travel on a surface comprising:

a trackway mountable on the surface;

elevated roadway and conveyor means for supporting the mobile conveyor thereon and receiving and conveying discharged material therefrom, said elevated roadway and conveyor means movably communicating with said trackway for travel thereon and being movable between a first elevated position wherein said elevated roadway and conveying means is supported on the surface and said trackway is movably supported on said elevated roadway and conveying means above the surface such that said trackway may be advanced to a first advanced position relative to said elevated roadway and conveying means and a second elevated position wherein said elevated roadway and conveying means is movably supported above the surface on said trackway for travel thereon such that said elevated roadway and conveying means may be advanced to a second advanced position on said trackway;

elevation means coupled between said elevated roadway and conveying means and said trackway, said elevation means selectively moving said elevated roadway and conveying means between said first and second elevated positions; and ramp means communicating with said elevated roadway and conveying means, said ramp means permitting the mobile conveying means to access said elevated roadway and conveying means.

2. The apparatus of claim 1 further comprising advancing means attached to said ramp means for selectively advancing said trackway to said first advanced position when said elevated roadway and conveying means is in said first elevated position and selectively advancing said elevated roadway and conveying means on said trackway to said second advanced position when said elevated roadway and conveying means is in said second elevated position.

3. The apparatus of claim 2 wherein said trackway is attached to said ramp means for travel therewith and wherein said advancing means comprises at least one advancing cylinder attached between said ramp means and said elevated roadway and conveying means, said advancing cylinder being selectively extendable to a first extended position wherein said trackway is moved to said first advanced position and a second retracted position wherein said elevated roadway and conveying means is advanced to said second advanced position on said trackway.

4. The apparatus of claim 2 wherein said trackway is attached to said ramp means for travel therewith and wherein said advancing means comprises at least two independently controllable advancing cylinders attached between said ramp means and said elevated roadway and conveying means, each said advancing cylinder being selectively independently extendable for selectively advancing said trackway to said first advanced position and selectively independently retractable for advancing said elevated roadway and conveying means to said second advanced position on said trackway.

5. The apparatus of claim 1 wherein said elevated roadway and conveying means is movably mounted to said trackway by a plurality of wheeled carriages movably attached to said elevated roadway and conveying means.

6. The apparatus of claim 5 wherein said elevation means comprises at least one elevation cylinder means attached to and corresponding with each said wheeled carriage, each said elevation cylinder being attached to said elevated roadway and conveying means and being selectively extendable and retractable such that when said elevational cylinder means are retracted, said elevated roadway and conveying means is moved to said first elevated position and when said elevation cylinder means are extended, said elevated roadway and conveying means is elevated to said second elevated position.

7. The apparatus of claim 6 wherein each said elevation cylinder means is pivotally attached to said corresponding carriage means and said elevated roadway and conveying means by a corresponding pivot member adapted to pivot between a first pivot position wherein said elevated roadway and conveying means is moved to said first elevated position and a second pivot position wherein said elevated roadway and conveying means is moved to said second elevated position.

8. The apparatus of claim 1 wherein said trackway comprises a plurality of track sections adapted to be removably interconnected end to end to enable said trackway to be selectively lengthened or shortened.

9. The apparatus of claim 8 further comprising locking means attached to each said track section for selectively locking said track sections together.

10. The apparatus of claim 1 wherein said elevated roadway and conveying means comprises:

a plurality of conveyor assemblies removably interconnected in series, each said conveyor assembly having a plurality of belt supporting members attached thereto for operatively supporting a portion of a driven endless member thereon; and elevated track means attached to each said conveyor assembly, said elevated track means forming an elevated roadway for supporting the mobile conveyor above the endless driven member for discharge thereupon.

11. A method for receiving and conveying material from a mobile conveyor adapted for travel on a surface comprising the steps of:

providing an elevated roadway and conveying means for supporting the mobile conveyor thereon and receiving and conveying the discharged material therefrom, said elevated roadway and conveying means communicating with a surface mounted trackway such that said elevated roadway and conveying means is movable between a first elevated position wherein said conveying means is supported on the surface and said trackway is movably supported on said elevated roadway and conveying means above the surface such that said trackway may be advanced to a first advanced position relative to said elevated roadway and conveying means and a second elevated position wherein said elevated roadway and conveying means is movably supported above the surface on said trackway for travel thereon such that said elevated roadway and conveying means may be advanced to a second advanced position on said trackway;

elevating said elevated roadway and conveying means to said first elevated position;

moving said mobile conveyor means onto said elevated roadway and conveying means by means of a ramp attached to said elevated roadway and conveying means;

advancing said trackway to said first advanced position;

elevating said elevated roadway and conveying means to said second elevated position and lowering said trackway onto the surface;

advancing said elevated roadway and conveying means to said second advanced position;

returning said elevated roadway and conveying means to said first elevated position; and removing said mobile conveyor from said elevated roadway and conveying means such that a portion of the mobile conveyor remains supported on the elevated roadway and conveying means for discharge thereon.

* * * * *

UNITED STATES PATENT AND TRADEMARK OFFICE
CERTIFICATE OF CORRECTION

PATENT NO. :     5,348,130
DATED       :     September 20, 1994
INVENTOR(S) :    Terry M. Thomas It is certified that error appears in the above-indentified patent and that said Letters Patent is hereby corrected as shown below:

Col. 11, line 10, delete "rack" and substitute therefor --track--.

Col. 14, line 4, delete "See Fig.1. Thereafter, the mobile conveyor assemblies 100."

Col. 14, line 18, delete "min" and substitute therefor --mine--.

Signed and Sealed this

Second Day of May, 1995

Attest:

BRUCE LEHMAN

Attesting Officer    Commissioner of Patents and Trademarks